United States Patent
Mazure et al.

(10) Patent No.: US 12,286,149 B1
(45) Date of Patent: Apr. 29, 2025

(54) GROOVED INTERMEDIATE SHAFT FOR ENERGY ABSORPTION IN STEERING SYSTEM

(71) Applicant: Steering Solutions IP Holding Corporation, Saginaw, MI (US)

(72) Inventors: Kyle R. Mazure, Saginaw, MI (US); Benjamin J. Kolhagen, Frankenmuth, MI (US); Jeffrey J. Toth, Auburn, MI (US); Leslie E. Edmundson, Clio, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 18/624,665

(22) Filed: Apr. 2, 2024

(51) Int. Cl.
*B62D 1/19* (2006.01)

(52) U.S. Cl.
CPC .................................. *B62D 1/192* (2013.01)

(58) Field of Classification Search
CPC ........................................................ B62D 1/192
See application file for complete search history.

(56) References Cited

U.S. PATENT DOCUMENTS

| | | | |
|---|---|---|---|
| 6,908,109 B2 * | 6/2005 | Lutz ...................... | B21C 37/154 |
| | | | 280/777 |
| 2009/0058060 A1 * | 3/2009 | Imagaki ................... | B62D 1/16 |
| | | | 280/771 |
| 2019/0388947 A1 * | 12/2019 | Moriyama .............. | B23P 15/00 |
| 2021/0163058 A1 * | 6/2021 | Enderlin ................ | B21D 17/04 |

* cited by examiner

*Primary Examiner* — Faye M Fleming
(74) *Attorney, Agent, or Firm* — Dickinson Wright PLLC

(57) ABSTRACT

An intermediate shaft for a steering system includes a main body having a radially outer surface. The intermediate shaft also includes a grooved portion located along the main body and defining at least one groove to allow deformation of the main body when a predetermined force on the main body is exceeded, wherein the entirety of the grooved portion does not radially exceed the radially outer surface of the main body.

12 Claims, 3 Drawing Sheets

GROOVED INTERMEDIATE SHAFT FOR ENERGY ABSORPTION IN STEERING SYSTEM

FIELD OF THE INVENTION

The embodiments disclosed herein relate to vehicle steering systems and, more particularly, a grooved intermediate shaft for energy absorption for use in vehicle steering systems.

BACKGROUND

Vehicle steering systems may include a continuous mechanical connection from a steering wheel to an output to transfer motion to carry out steering maneuvers. Part of the mechanical connection often includes an intermediate shaft which connects other components within the steering system.

Vehicle manufacturers may require the use of collapsing or buckling tubes in intermediate shaft designs to prevent significant forces from being exhibited to the steering column and occupant in a crash event. In prior intermediate shaft designs, outwardly formed convolute geometry is often utilized to achieve the buckling performance required by the vehicle manufacturers, as shown in FIG. 3. This convolute geometry in the tubes can only be formed using a specialized process called hydroforming. Hydroforming is performed only by a handful of known manufacturers and is a costly process.

SUMMARY

According to one aspect of the disclosure, an intermediate shaft for a steering system includes a main body having a radially outer surface. The intermediate shaft also includes a grooved portion located along the main body and defining at least one groove to allow deformation of the main body when a predetermined force on the main body is exceeded, wherein the entirety of the grooved portion does not radially exceed the radially outer surface of the main body.

According to another aspect of the disclosure, a vehicle steering system includes a steering shaft assembly having a first component and a second component. The vehicle steering system also includes an intermediate shaft mechanically coupling the first component and the second component, wherein the first component, the second component, and the intermediate shaft transmit rotation and torque to each other. The intermediate shaft includes a main body having a radially outer surface. The intermediate shaft also includes a first grooved portion located along the main body and defining a plurality of grooves to allow deformation of the main body when a predetermined force on the main body is exceeded, wherein the entirety of the first grooved portion does not radially exceed the radially outer surface of the main body. The intermediate shaft further includes a second grooved portion located along the main body and defining a plurality of grooves to allow deformation of the main body when a predetermined force on the main body is exceeded, wherein the entirety of the second grooved portion does not radially exceed the radially outer surface of the main body.

According to another aspect of the disclosure, a method of forming an intermediate shaft of a vehicle steering system is provided. The method includes forming a tubular main body having a radially outer surface. The method also includes rolling a plurality of grooves into the tubular main body, wherein each of the grooves extends radially inwardly relative to the radially outer surface of the tubular main body. The method further includes heat treating the intermediate shaft after rolling the plurality of grooves.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

The following discussion is directed to various embodiments of the disclosure. Although one or more of these embodiments may be described in more detail than others, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
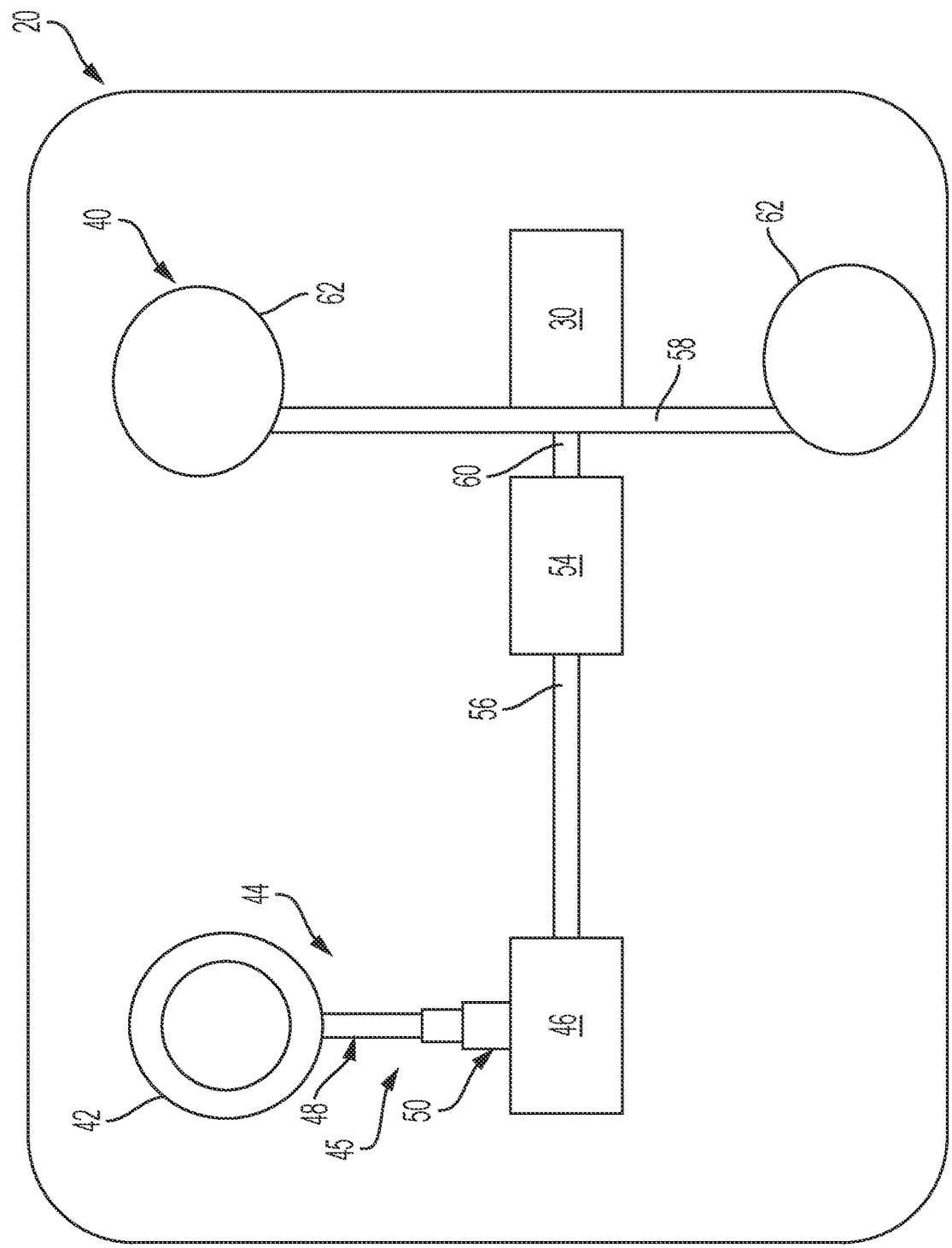
FIG. 1 is a schematic illustration of a vehicle steering system.

Referring initially to FIG. 1, a vehicle 20 is generally illustrated according to the principles of the present disclosure. The vehicle 20 may include any suitable vehicle, such as a car, a truck, a sport utility vehicle, a mini-van, a crossover, any other passenger vehicle, any suitable commercial vehicle, or any other suitable vehicle. While the vehicle 20 may be a passenger vehicle having wheels and for use on roads, the principles of the present disclosure may apply to other vehicles, such as planes, tractors, boats, or other vehicles. The vehicle 20 may include a propulsion system 30, such as an ignition system, an electronic system, or combinations thereof.

The vehicle 20 further includes a steering system 40. The steering system 40 may be configured as a driver interface steering system, an autonomous driving system, or a system that allows for both driver interface and autonomous steering. The steering system 40 may include an input device 42, such as a steering wheel, wherein a driver may mechanically provide a steering input by turning the steering wheel. A steering column assembly 44 includes a steering column 45 that extends along an axis from the input device 42 to an output assembly 46. The steering column 45 may include one or more axially adjustable portions, for example, an upper jacket 48 and a lower jacket 50 that are axially adjustable with respect to one another. It is to be appreciated that other structural features of the steering column 45 may be part of the upper jacket 48 and the lower jacket 50, such as brackets, rails, other devices, or combinations thereof.

A steering gear assembly 54, the output assembly 46 and the steering input device 42 may be connected via a steering shaft assembly 56. The steering shaft assembly includes an intermediate shaft, a cardan joint, and any other conventional steering shaft assembly features.

The steering gear assembly 54 may be configured as a rack-and-pinion, a recirculating ball-type steering gear, or any other types of steering gears associated with autonomous and driver-interface steering systems. The steering gear assembly 54 may then connect to a driving axle 58 via an output shaft 60. The output shaft 60 may include a pitman arm and sector gear and/or various traditional components. The output shaft 60 is operably connected to the steering gear assembly 54 such that a rotation of the steering shaft assembly 56 causes a responsive movement of the output shaft 60 and causes the drive axle to turn wheels 62. It is to be appreciated that the steering components described herein are part of an overall assembly which includes a direct mechanical linkage over the span of the components.

Figure 2:
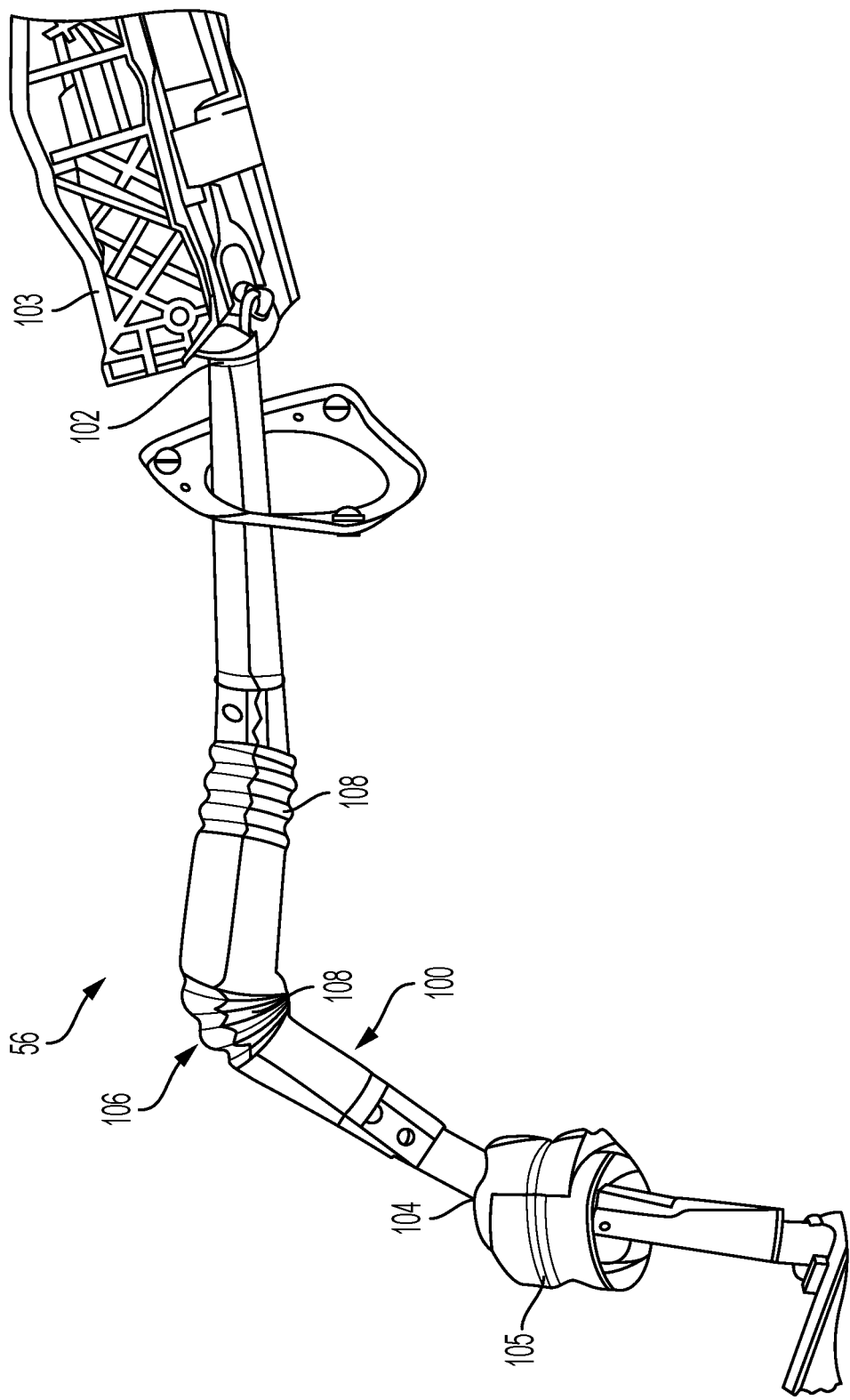
FIG. 2 is a perspective view of a portion of the vehicle steering system after a collapse event.

Referring now to FIG. 2, a portion of the steering shaft assembly 56 is shown in more detail. In particular, the steering shaft assembly 56 includes an intermediate shaft 100 extending from a first end 102 to a second end 104. The intermediate shaft 100 is to mechanically connect other components of the steering shaft assembly 56 in a manner which allows a transmission of rotation, and therefore torque, between the components to carry out steering commands from an operator and/or to provide road feedback to an operator. For example, a first component 103 may be coupled to the first end 102 of the intermediate shaft 100 and a second component 105 may be coupled to the second end 104 of the intermediate shaft 100.

The intermediate shaft 100 is shown in a deflected condition after absorbing energy, as disclosed in connection with the embodiments herein. Although the intermediate shaft 100 is shown in a bent condition at a position referenced with 106, it is to be understood that buckling of the intermediate shaft 100 may include substantially linear collapsing along a longitudinal axis of the intermediate shaft and/or bending. Collapse of the intermediate shaft 100 allows for an absorption of energy during an impact event of the vehicle to reduce the energy transferred through the overall steering system 40 to an occupant. As described herein, collapse of the intermediate shaft 100 is facilitated by grooved regions 108 formed on an outer surface of the intermediate shaft 100. It is to be appreciated that the steering system 40 may include other energy absorption structures and schemes to complement the grooved regions 108 of the intermediate shaft 100.

Figure 3:
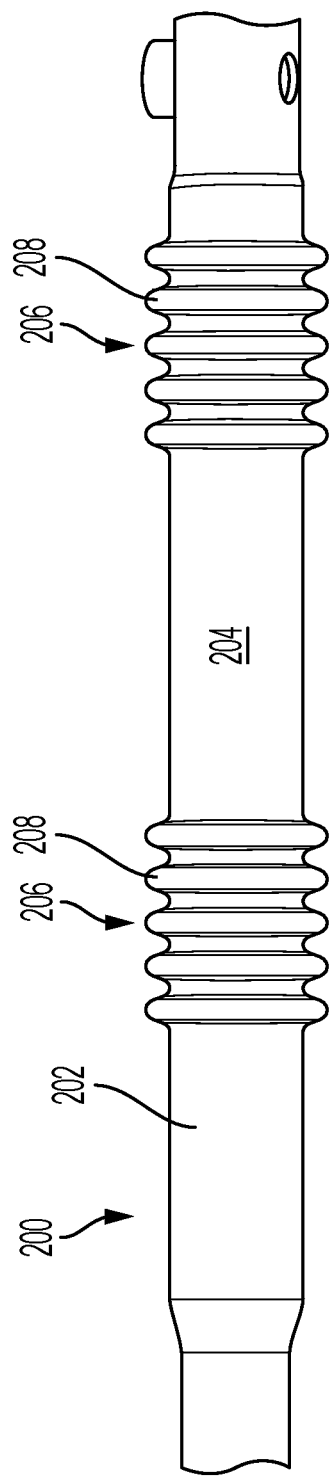
FIG. 3 is an elevation view of a prior art intermediate shaft.

Referring now to FIG. 3, an intermediate shaft which is representative of prior art designs is illustrated and referenced generally with numeral 200. The intermediate shaft 200 includes a main body 202 having a radially outer surface 204 with convolute geometry regions 206 extending radially outward from the radially outer surface 204. The convolute geometry regions 206 include a plurality of annular ridges 208 which protrude outward from the remainder of the main body 202 of the intermediate shaft 200. The annular ridges 208 require additional space for packaging considerations and involve complex and costly manufacturing processes. For example, a hydroforming process is typically required to form the convolute geometry regions.

Figure 4:
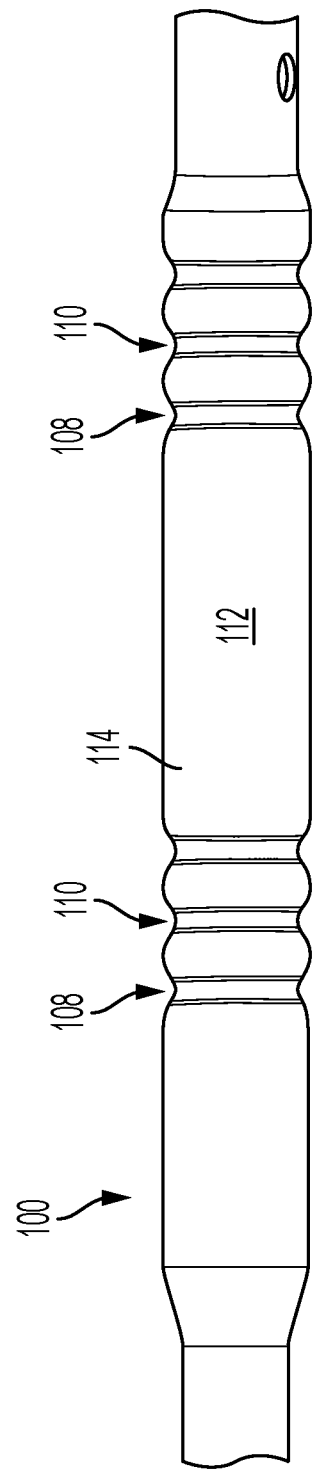
FIG. 4 is an elevation view of an intermediate shaft according to the embodiments disclosed herein.

Referring now to FIG. 4, the intermediate shaft 100 of the embodiments disclosed herein is shown in more detail. The intermediate shaft 100 is a hollow tube which includes the grooved regions 108. While two grooved regions 108 are shown, it is to be understood that the intermediate shaft 100 may include only one grooved region 108 or more than the illustrated pair of grooved regions 108. Regardless of the number of grooved regions 108 present on the intermediate shaft 100, each grooved region 108 includes a plurality of grooves 110 which extend radially inwardly from a radially outer surface 112 of a main body 114 of the intermediate shaft 100. In contrast to prior art intermediate shafts, such as that represented in FIG. 3, the intermediate shaft 100 of the disclosed embodiments includes radially inwardly extending grooves 110 to advantageously limit the packaging space requirements of the intermediate shaft 100 within the overall steering system 40 to the radially outer surface 112 of the main body 114. In other words, the portions of the intermediate shaft 100 which facilitate deformation of the intermediate shaft 100 do not protrude radially beyond the radially outer surface 112 of the main body 114 of the intermediate shaft 100.

The grooves 110 of intermediate shaft 100 create structurally weakened sections, relative to the remainder of the main body 112. The force created during an impact event travels through the intermediate shaft 100 and when a high enough force is present, the grooved regions 108 begin to deform (e.g., buckle and bend) due to the grooves 110. The deformation of the intermediate shaft 100 absorbs energy and prevents the full impact of the force from being felt by the vehicle operator, thereby improving the safety of the vehicle.

Various design parameters of the grooves 110 may be adjusted based on the particular application requirements. For example, the geometry of the grooves 110, including the depth and width of the grooves 110, may be customized based on the buckling initiation requirements and the torsional strength required to properly transmit torque during normal operation of the steering shaft assembly 56. In addition to the geometry of the grooves 110, the spacing between adjacent grooves may be customized to meet the aforementioned requirements. In some embodiments, the grooves 110 extend radially inwardly to a common depth, have common widths, and/or are spaced equally from each other. In other embodiments, the groove widths, depths or spacing may differ from each other.

The grooves 110 may be formed on the intermediate shaft 100 with any suitable process. However, according to a method of the disclosure, the grooves 110 may be formed with a rolling process and subsequently heat treated with an annealing process.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. An intermediate shaft for a steering system comprising:
   a main body having a radially outer surface; and
   a grooved portion located along the main body and defining at least one groove to allow deformation of the main body when a predetermined force on the main body is exceeded, wherein the entirety of the grooved portion does not radially exceed the radially outer surface of the main body, wherein the grooved portion is a first grooved portion, the intermediate shaft further comprising a second grooved portion located along the main body spaced from the first groove portion, the second grooved portion defining at least one groove to allow deformation of the main body when a predetermined force on the main body is exceeded, wherein the entirety of the second grooved portion does not radially exceed the radially outer surface of the main body.

2. The intermediate shaft of claim 1, wherein the first grooved portion and the second grooved portion each include a plurality of grooves, wherein each of the plurality of grooves extends radially inwardly from the radially outer surface of the main body.

3. The intermediate shaft of claim 2, wherein the plurality of grooves of the first grooved portion or the second grooved portion extend radially inwardly to a common depth.

4. The intermediate shaft of claim 2, wherein the plurality of grooves of the first grooved portion or the second grooved portion have a common width.

5. The intermediate shaft of claim 2, wherein the plurality of grooves of the first grooved portion or the second grooved portion are equally spaced from each other.

6. The intermediate shaft of claim 1, wherein at least one of the first grooved portion and the second grooved portion includes a plurality of grooves, wherein each of the plurality of grooves extends radially inwardly from the radially outer surface of the main body.

7. The intermediate shaft of claim 1, wherein the main body is a tubular member.

8. A vehicle steering system comprising:
a steering shaft assembly having a first component and a second component; and
an intermediate shaft mechanically coupling the first component and the second component, wherein the first component, the second component, and the intermediate shaft transmit rotation and torque to each other, wherein the intermediate shaft comprises:
a main body having a radially outer surface;
a first grooved portion located along the main body and defining a plurality of grooves to allow deformation of the main body when a predetermined force on the main body is exceeded, wherein the entirety of the first grooved portion does not radially exceed the radially outer surface of the main body; and
a second grooved portion located along the main body and defining a plurality of grooves to allow deformation of the main body when a predetermined force on the main body is exceeded, wherein the entirety of the second grooved portion does not radially exceed the radially outer surface of the main body.

9. The vehicle steering system of claim 8, wherein the plurality of grooves of at least one of the first grooved portion and the second grooved portion extend radially inwardly to a common depth.

10. The vehicle steering system of claim 8, wherein the plurality of grooves of at least one of the first grooved portion and the second grooved portion have a common width.

11. The vehicle steering system of claim 8, wherein the plurality of grooves of at least one of the first grooved portion and the second grooved portion are equally spaced from each other.

12. A method of forming an intermediate shaft of a vehicle steering system, the method comprising:
forming a tubular main body having a radially outer surface;
rolling a plurality of grooves into the tubular main body, wherein each of the grooves extends radially inwardly relative to the radially outer surface of the tubular main body; and
heat treating the intermediate shaft after rolling the plurality of grooves.

* * * * *